(12) United States Patent
Sluiman et al.

(10) Patent No.: US 7,380,170 B2
(45) Date of Patent: May 27, 2008

(54) TESTING MEASUREMENTS

(75) Inventors: Harm Sluiman, Scarborough (CA); Marcelo Paternostro, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 10/294,248

(22) Filed: Nov. 14, 2002

(65) Prior Publication Data

US 2007/0174709 A1   Jul. 26, 2007

(30) Foreign Application Priority Data

Feb. 7, 2002   (CA) ................................. 2365733

(51) Int. Cl.
*G06F 11/00* (2006.01)
(52) U.S. Cl. .................... 714/38; 714/26; 714/30; 714/33
(58) Field of Classification Search ................ 714/26, 714/33
See application file for complete search history.

(56) References Cited

U.S. PATENT DOCUMENTS 6,219,829 B1 * 4/2001 Sivakumar et al. ......... 717/131

OTHER PUBLICATIONS

Appendix A (CA9-2001-0091US1).
Appendix B (CA9-2001-0092US1)—Arbiter Facility.
* cited by examiner

*Primary Examiner*—Robert Beausoliel
*Assistant Examiner*—Charles Ehne
(74) *Attorney, Agent, or Firm*—Francis Lammes; Stephen J. Walder, Jr.; Jeffrey S. LaBaw (57) ABSTRACT

Embodiments of the invention include an arbiter facility included in a test script. The arbiter facility includes properties defining a method for evaluating the status of a step or process, a method for evaluating verification point results and the steps to execute during execution of the test script. The arbiter facility operates to control the flow of the processes performed that form the test script. The control of the processes that are performed are based on explicit rules or conditions. The rules implemented by the arbiter facility can result in different processes within the test script being performed based on data processed by the arbiter facility. Moreover, aspects of the invention embodied by the arbiter facility implement rules which explicitly express, within the test case, the value (e.g., weight, importance, etc.) of individual operations. In the exemplary embodiment, the value of one or more individual operations are explicitly expressed by the rules (e.g., computations, calculations, determinations, etc.) that are imposed on the results returned to the arbiter facility by the various verification points within the test script. Accordingly and advantageously, analysis on the value of a verification point may be performed prior to implementing or executing a test script. This analysis may then be reflected in the rule implemented in the arbiter facility.

7 Claims, 12 Drawing Sheets

```
package darkroom;
/**
*This arbiter analyzes the verification points of the DarkRoomTestcase testcase.
* There are two types of VP considered:
*
* <p>DoorVP; Each door on the dark room has at least one sensor that indicates if the
* light penetrates more than 1 meter inside the room. After some research it was
* proven that if 4 doors don't block the light
* the dark room should not be used.
*
* <p>RoomVP: Some of the monitored dark rooms have a central sensor that indicates if
* the dark room fits the requirements.
*
* <p>The role of this arbiter is to validate these business rules by inspecting the
* boolean results of each VP set during an execution of the DarkRoomTestcase testcase.
* This analyses will define if the testcase execution passed or failed.
*
* <p>The testcase execution engine is the element responsible for executing the
analyze ( ) method of the arbiter on the appropriate time.
*/ import testcase.*;

public class DarkRoomArbiter
extends Arbiter
{
      private static int ROOM_VP_FAIL_LIMIT - 4;

/**
       * The testcase associated to this arbiter must be a DarkRoomTestcase
       */ public DarkRoomArbiter (DarkRoomTestcase testcase)
            {
```

```
            super (testcase);
    }

/**
    * This method iterates through all the TestcaseInstruction of this arbiter's testcase.
    * If the instruction is a RoomVP and the result is false, the analysis must
    * return false. If the instructions is a DoorVP, the number of fails is accumulated into
    * a variable and checked against the fail limit returning fail if these values are equal.
    * Otherwise this method returns true indicating that the testcase execution was succeeded
    */ public int analyze ( )
    {
        int totalNumberOfLeaks = 0;
        TestcaseInstruction [ ] instructions =
getTestcase () _getInstructions ( );
        for (int i=0, max=instructions, length; i++)
        {
            if(instructions[i]  instanceof DoorVP)
            {
                int result = instructions[i].gotResult ( ) ;
                if(result = = VarificationPoint.FAILED)
                    totalNumberOfLeaks++;

if(totalNumberOfLeaks == ROOM_VP_FAIL_LIMIT)
                    return FAILED;
            } if(instructions[i] instanceof RoomVP)
```

602 braces the DoorVP block; 506 braces the larger section.

FIG. 6B

```
          {
              int result = instructions [i].getResult ( );
              if(result == VerificationPoint_FAILED)
                  return FAILED;
          }
604   {
      } return SUCCEED;
      }

/**
       * During in the exemplary Testcase execution, instructions are, if every
       * verification point is successful, executed in a specified order.
       * If a instruction is a Verification Point, the method below will be invoked
       * immediately after execution of the verification point
       * For the DarkRoom evaluation this method should return the result of a
       * RoomVP or a DoorVP. Otherwise a NOT_DEFINED is returned for all the
       * other types of verification points (there are none in the exemplary
       * embodiment).
       * Although the exemplary embodiment does not include complex rules
       * for analysis, this method could be implemented to provide such
       * complexity. The value returned by this method may then be used by
       * the other portions of the test case (e.g., DarkRoomTestcase)
       * to affect changes (i.e., control) in the flow of execution of
       * instructions (e.g., testing portions).
       */
504
      public int analyze (VerificationPoint vp)
      {
          if (vp instanceof RoomVP)
          /**
           * Analysis of RoomVP verification point results
           */
              return vp.getResult( );
```

FIG. 6C

```
C                                                                               C
─┬──────────────────────────────────────────────────────────────────────────────
 │      if (vp instanceof DoorVP)
 │          /**
 │           * Analysis of DoorVP verification point results
 │           */
 │          return vp.getResult( );
 └ return NOT_DEFINED;
    }
 }
```

FIG. 6D

```
D                                                                               D
─┬──────────────────────────────────────────────────────────────────────────────
 │           /**
 │            * Commands to modify Flow of Execution. Since the RoomVP data is
 │            * the most important in this embodiment, terminate the
execution
 └           * if the RoomVP returns a failure.
             * A final message could also be issued.
             */
            return FAILED;
          }
          continue;
        }
      }
    }
}
```

FIG. 7E

```
package darkroom;                                            ⎫— 402

/**
*This testcase was created for testing a dark room. Each door of the
* dark room has one or more light sensors placed in a way that an amount of
* light is never perceived by two sensors of the same door.
*/ import testcase.*;

public class DarkRoomTestcase        ⎫
extends Testcase                     ⎬— 502
{
    private int doorCount;           ⎭

/**
    * To instantiate a DarkRoomTestcase it is necessary to
    * specify the number of doors on the room and the instructions that will
    * be executed.
    */
    public DarkRoomTestcase (TestcaseInstruction[ ] instructions, int doorCount)
    {
        super (instructions);
        this.doorCount = doorCount;

new DarkRoomArbiter(this);
    }

/**
    * This function implements the execution of the DarkRoomTestcase testcase. Basically
    * it will execute each one of the testcase instructions in the specified order and on
```

FIG. 7A

```
 * the appropriate way. The instructions executed and their order of execution may
 * be altered depending on the analysis performed on the data returned by the
 * verification points previously executed.
 */
public void executeTC ( )
{

/*
        This array stores the quantity of light not blocked by each door.
        The doors are numbered from 0 to (doorCount-1).
    */
    int [ ] footCandleByDoor = new int [doorCount];

/*
        Iterate through all the testcase instructions. Change flow depending.
        on verification point data analysis.
    */                                                              ← 702
    for (int i=0; i<getInstructions ( ) .length; i + +)
    {
        TestcaseInstruction instruction - getInstructions ( ) [i];

/*
            A MeasureFootCandle instruction execution activates a
            particular door sensor that measures the quantity of light
            and returns the value as a valid integer. The door and the
            sensor were defined during the testcase design.

<p>The quantity light is accumulated on the array. It is
            expected that a sensor is never activated twice.
        */
        if(instruction instanceof MeasureFootCandle)
        {
            MeasureFootCandle measureFootCandle =
                (MeasureFootCandle) instructions;
```

FIG. 7B

```
                    measureFootCandle.execute ( ) ;
                    int door = measureFootCandle.getDoorNumber ( ) ;
                    int footCandle = measureFootCandle.getResult ( ) ;
                    footCandleByDoor[door] += footCandle;

continue;
            }
            /*
                The DoorVP verification point is responsible for reporting the amount
of
                    light of a particular door during the testcase execution. This is
done
                    by setting the verification point value with the appropriate value of
the
                    array.
                <p> The purpose of this verification point is to improve the log and/or
                to allow the testcase execution engine to change the execution flow
based                                                            ← 704
                    on the information obtained.
            */
            if (instruction instanceof DoorVP)
            {
                DoorVP vp = (DoorVP) instruction;

int door = vp.getDoorNumber ( );
                vp.setFootCandle(footCandleByDoor[door]);
  708 →         vp.execute ( ) ;

/**
                *Analyze the verification point data. If the verification       504
                * point returns a FAILED, Modify flow of execution
```

FIG. 7C

```
       */
      if (darkroom.analyze(vp) = = FAILED)
      {
           /**
            * Commands to modify Flow of Execution. A warning
            * could be issued but execution allowed to continue
            */
      }
      continue;
   }
   /*                                              ← 706
      The RoomVP verification point is responsible for reporting
      the total amount of light on the dark room. This is done by
      adding all the values stored on the array.
    */
   if(instruction instanceof RoomVP)
   {
      RoomVP vp = (RoomVP) instruction;

int totalFootCandle = 0;
      for (int j=0; j<doorCount; j++)
            total FootCandle += footCandleByDoor (j);

vp.setFootCandle(totalFootCandle);
      vp.execute( ) ;

/**
       * Analyze the verification point data. If the verification
       * point returns a FAILED, Modify flow of execution.
       */
      if (darkroom.analyze(vp) = = FAILED)
      (
```

TESTING MEASUREMENTS

CROSS-REFERENCE TO RELATED APPLICATIONS

The present application is related to copending commonly assigned U.S. patent application Ser. No. 10/294,994, entitled: Organization of Test Cases and U.S. patent application Ser. No. 10/294,945, entitled: Testing Measurements, which are hereby incorporated by reference.

FIELD OF THE INVENTION

The present invention relates generally to the testing of computer applications and, more particularly, to testing measurements.

BACKGROUND OF THE INVENTION

Most computer applications (hereinafter "applications") are very complex systems that, due to their complexity, require significant testing to ensure that the application will execute as desired.

To facilitate the testing of applications, test cases or test suites (essentially a collection of test cases) are designed, implemented and used to test a portion or the whole of an application (often referred to as the subject under test). In many applications, these test cases manipulate the external facade or interface of the subject under test. The results of these test cases are then analyzed and evaluated. As many applications are quite complex, several, sometimes hundreds, of test cases are used for the testing of a single application.

For example, a database application may need to be tested to determine whether data can be added to the database (this is the test case). A test script would need to be created to implement the test case. The exemplary test script could include several steps, instructions or processes to test this aspect of the application including: gaining access to update the database, transmitting the update request; receiving confirmation that the update request has been executed; reading from the database to determine if the data in the update request was stored successfully; and then logging off from the database.

The processes or steps within a test script are executed linearly. Interspersed amongst these steps are one or more verification points which are designed to gather data representative of the operation of the subject under test. A verification point, when inserted into the test script, will issue or output a binary value (usually a single bit of data—e.g., a boolean value) that indicates whether a step(s) with which the verification point is associated was successfully or unsuccessfully completed. The output of the test script execution, which includes the values output by the verification points, is typically stored in a test case execution log.

The verification points also enable testers to analyze the test case execution log to ascertain which processes in the test case failed and, thus, which portions of the subject under test need to be investigated to rectify any problems (i.e., solve any bugs in the application, if necessary).

If a tester desires to vary the linearity of the execution model associated with the test script, then the test script is exposed by the testing tool and the tester manually modifies the test script (using, typically, a language proprietary to the testing tool being used). Unfortunately, this type of modification is not usually further supported by the testing tool. That is, the testing tool will execute the modifications and provide a mechanism to run and modify the test script, but the test tool does not provide any advanced tools which operate in conjunction with the modifications.

As a consequence of the ability to make manual modifications, many advanced testers use testing tools to create only a skeleton of a test script and add the "guts" or substance of the test script manually. This type of use leads to considerable costs for maintaining the test scripts.

Some testing tools presently on the market will terminate the execution of a test script as soon as a single verification point is reached which indicates that an associated step was not performed successfully. Other testing tools will attempt, if possible, to continue processing the test script execution and outputting data from the verification points.

As a result of the data output by the verification points, a test script execution will generate an output which indicates whether the application successfully or unsuccessfully performed the test case (the test output). The test output of the test script execution (which is in addition to test logs that are typically generated) is, like the output of a verification point, a binary value. If even a single step in the test script failed then the entire test script execution will output a value also indicating failure of the execution of test script (i.e., the application failed in performing the test case). Only when all steps are successfully performed will the test script output indicate successful completion.

It will be appreciated that when a deadline for release of an important application draws near, the application developers (the development team) are under considerable stress to have the application ready for release with a minimum number of bugs or quality or stability related issues. At this time, review of the test output data generated by the test scripts executions is often at its highest. During this review, much effort and time is spent attempting to ascertain the reason certain test script execution has failed to complete successfully indicating a likely problem with the subject under test. It is common in the industry, especially as deadlines loom, to disregard the test results from some test scripts execution for a variety of reasons. For example, a test script may be considered by the development team as testing an "unimportant" or "inconsequential" aspect of the subject under test. Other test scripts may be disregarded on an ad hoc basis because of a developer's intuition or experience indicating that the unsuccessful result from the execution of a test script was not as a result of a failure of the subject under test but rather another application or component (e.g., the operating system, memory management, etc.). Unfortunately, this analysis is often inaccurate or misguided and potentially results in the release of an unacceptable application. Moreover, the rationale for ignoring some test results while relying on others is not documented which may prove unfortunate after a product has been released.

In a further shortcoming of known systems, significant time may be spent analyzing the unsuccessful results issued by a test script execution in an attempt to ascertain the cause(s) of the failure. This analysis is premised on the possibility that all failures should be determined and that most or sometimes all of the failures are the result of flaws or bugs in the subject under test. However, in some instances, the failure may be the result of a failure in another portion of the computer system(s) on which the subject under test is relying. In such an instance, a developer or tester may have misspent significant time and energy investigating a flaw which is not caused by the subject under test.

For example, returning to the database example described above, suppose that the test script process for logging off from the database required transmitting to the database a "logoff" command. Further assume that the database itself (and not the application/subject under test) had a slight bug that issued an error message despite properly logging off a user. In this scenario, the verification point associated with the portion of the test script for logging off would output indication of a failure and the test script, even if every other process completed successfully, would, as a result of the reported logoff failure, also generate test output indicating a failure of the subject under test. Moreover, while this failing result may be technically accurate (i.e., the test script did not successfully complete each of the processes contained therein) it is misleading and inaccurate in substance (i.e., the subject under test actually successfully performed all of its processes and only another element relied upon by the subject under test failed). This situation could lead to significant time and energy being spent by a developer attempting to eradicate a bug in the subject under test which does not exist (the bug exists in the database).

Since a test script may incorporate several (sometimes hundreds) of verification points, much effort needs to be expended to determine a source of a failure reported by a test script. In many circumstances, once the verification point reporting a failure which contributed (in whole or in part) to the failure of a test script is identified, a developer or tester may decide that the identified verification point can be disregarded. This information is often not passed on to other developers or testers which often results in other developers or testers wasting time performing identifying the verification point and then reaching the same conclusion to disregard the results. In other circumstances, a decision reached by a developer to disregard one or more verification points in a test script is made without significant thought or consideration and the resulting decision to disregard is flawed or faulty. Alternatively, one developer may conclude that results from a particular verification point can be disregarded while a different developer reaches a different conclusion. As a result of this types of situations, present test scripts and testing methodologies have significant shortcomings.

Accordingly, a testing measurement which addresses, at least in part, some of the shortcomings described above is desired.

SUMMARY OF THE INVENTION

The present invention is directed to a testing measurement, and related methods, apparatus, systems and tools which address, at least in part, some the various described shortcomings.

Aspects of the invention include an arbiter facility included in a test script. The arbiter facility includes properties for: evaluating the status of a step or process; evaluating verification point results; and control of the instructions to execute during execution of the test script.

The arbiter facility in cooperation with other aspects of the test script operates to control the flow of the processes performed that form the test script. The control of the processes that are performed are based on explicit rules or conditions. The rules implemented by the arbiter facility can result in different processes within the test script being performed based on data processed by the arbiter facility. In the exemplary embodiment, the test script uses data received from verification points which are analyzed by the arbiter facility to determine which processes within the test script are to be performed. That is, in the exemplary embodiment, the test result received from a verification point (which assesses the success, failure, relative success, etc., of one or more processes in the test script) is used to determine which further processes within the test script are to be performed. The explicit expression of the rules which govern the flow of the processes performed is in contrast to present known systems where either a test script is performed linearly until a verification point reports a failure or until the test script cannot be performed further (i.e., where the test script completes successfully in its entirety or execution of the test script has aborted).

Moreover, aspects of the invention embodied by the arbiter facility implement rules which explicitly express, within the test case, the value (e.g., weight, importance, etc.) of individual operations. In the exemplary embodiment, the value of one or more individual operations are explicitly expressed by the rules (e.g., computations, calculations, determinations, etc.) that are imposed on the results returned to the arbiter facility by the various verification points within the test script. Accordingly and advantageously, analysis on the value of a verification point may be performed prior to implementing or executing a test script. This analysis may then be reflected in the rule implemented in the arbiter facility.

In accordance with an aspect of the present invention there is provided a tool for generating a test script for testing at least a portion of a computer application, said test script comprising: a first verification point adapted to output a first result indicative of a first test of said computer application; a second verification point adapted to output a second result indicative of a second test of said computer application; and an arbiter facility adapted to output result data using at least one of said first and second results, said arbiter facility explicitly expressing a formula valuing at least one of said first and second results.

In accordance with another aspect of the present invention there is provided a test script for testing at least a portion of a computer application, said test script comprising: a predefined execution flow of a plurality of instructions, wherein said plurality of instructions, when executed, test said at least a portion of said computer application, said predefined execution flow identifying at least one of: the order of execution of said plurality of instructions; and the instructions to be executed from said plurality of instructions; a first verification point associated with at least one of said plurality of instructions, said first verification point adapted to generate output indicative of the result of execution of said at least one of said plurality of instructions; and an arbiter facility, responsive to output from said first verification point, adapted to modify said predefined execution flow of said plurality of instructions.

In accordance with still another aspect of the present invention there is provided a method for testing at least a portion of a computer application using a test script, said method comprising: responsive to data generated by a verification point, analyzing said data; and modifying a predefined execution flow of said test script.

In accordance with still another aspect of the present invention there is provided method for testing at least a portion of a computer application using a test script, said method comprising: responsive to data generated by each of a plurality of verification points, employing expressed verification point valuation rules to value each of said plurality of verification points; and generating a test script output responsive to the value of each of said verification points.

In accordance with still another aspect of the present invention there is provided a computer readable media storing instructions and data, wherein said instructions and data, when executed by a computer system, adapt said computer system to generate a test script for testing at least a portion of a computer application, said test script comprising: a first verification point adapted to output a first result indicative of a first test of said computer application; a second verification point adapted to output a second result indicative of a second test of said computer application; and an arbiter facility adapted to output result data using at least one of said first and second results, said arbiter facility explicitly expressing a formula valuing at least one of said first and second results.

In accordance with still another aspect of the present invention there is provided a computer readable media storing data and instructions, said data and instructions, when executed by a computer system, adapt said computer system to generate a test script for testing at least a portion of a computer application, said test script for adapting a computer system to: responsive to data generated by a verification point, analyze said data; and modify a predefined execution flow of said test script.

In accordance with still another aspect of the present invention there is provided a computer readable media storing data and instructions, said data and instructions, when executed by a computer system, adapt said computer system to test at least a portion of a computer application using a test script, said test script adapting a computer system to: responsive to data generated by each of a plurality of verification points, employ expressed verification point valuation rules to value each of said plurality of verification points; and generate a test script output responsive to the value of each of said verification points.

In accordance with still another aspect of the present invention there is provided a method for testing at least a portion of a computer application using a test script, said method comprising: responsive to data generated by a verification point, means for analyzing said data; and means for modifying a predefined execution flow of said test script.

In accordance with still another aspect of the present invention there is provided method for testing at least a portion of a computer application using a test script, said method comprising: responsive to data generated by each of a plurality of verification points, means for employing expressed verification point valuation rules to value each of said plurality of verification points; and means for generating a test script output responsive to the value of each of said verification points.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
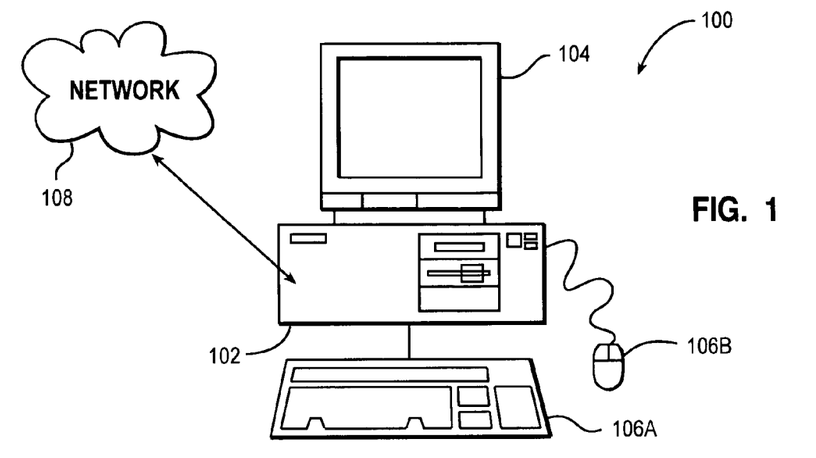
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 108. As will be appreciated by those of ordinary skill in the art, network 108 may be embodied using conventional networking technologies and may include one or more of the following: local area networks, wide area networks, intranets, public Internet and the like. Computer system 100 may interact with other networked computer systems (not shown) providing application testing and analysis of a distributed application.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 108. However, for ease of understanding, aspects of the invention have been embodied in a single computing device—computer system 100.

Computer system 100 includes processing system 102 which communicates with various input devices 104, output devices 106 and network 108. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
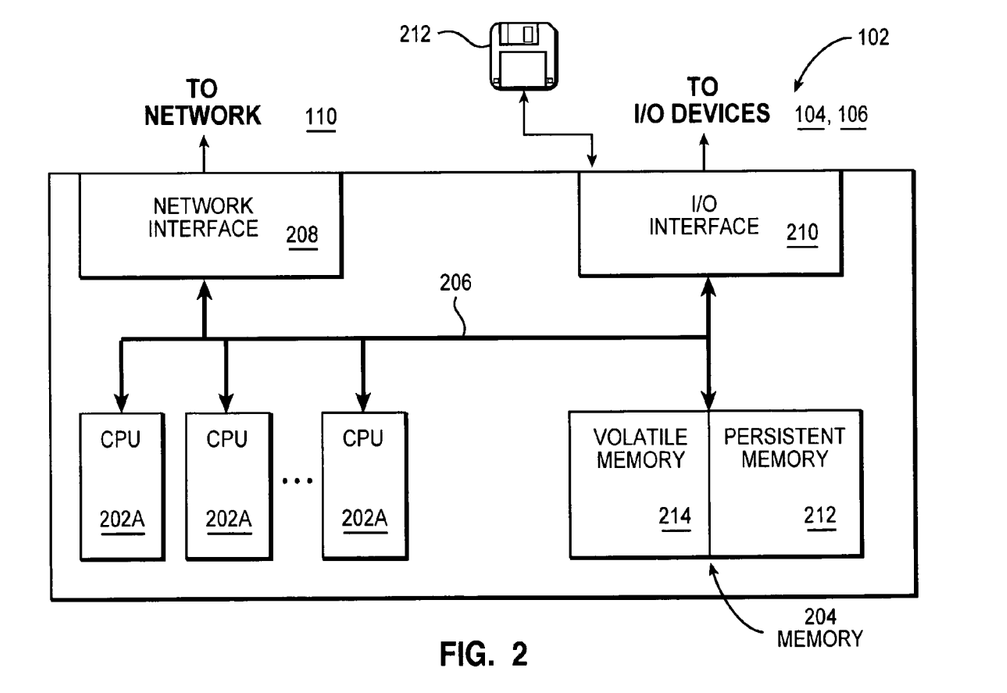
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various 1/0 devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
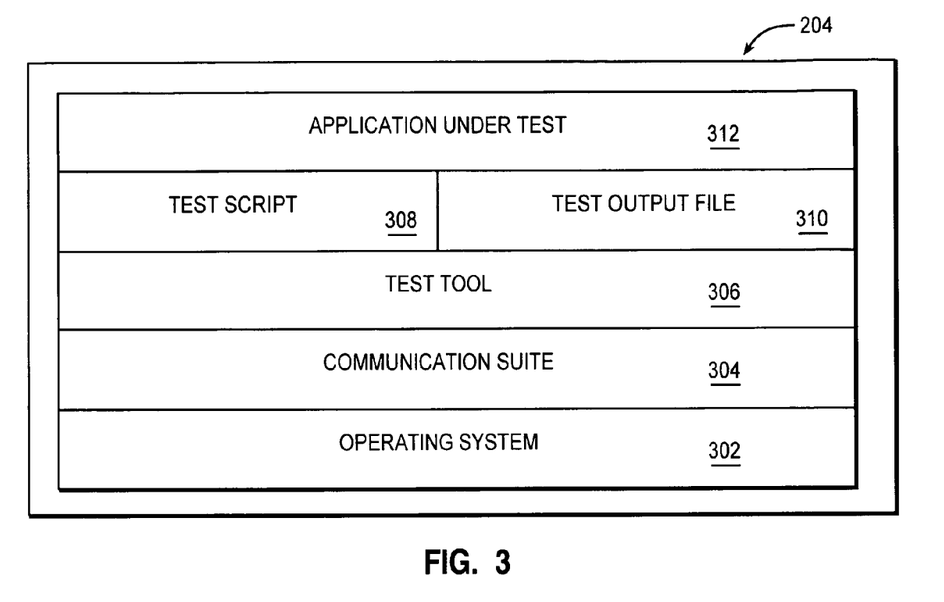
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 202 stores operating system (OS) 302, communications suite 304, test tool 306, test script 308, test output file 310 and the application under test 312 (hereinafter "application 312").

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 108 (FIG. 1). Communication suite 304 may include one or more of such protocols such as TCP/IP, ethernet, token ring and the like.

Test tool 306 is used by testers and developers to generate test scripts 308 which, when executed, test aspects of application 312 and generate test output file 310. Test tool 306 may be adapted from conventional or known test tools to perform the functions described herein. Test tool 306 may be used to: partially automate the entire testing process from generating test script 308; test application 312 using test script 308; and present the data in test output file 310 output by test script 308. Test tool 306 is used to generate test scripts which include the functionality of the arbiter facility described below.

Figure 4:
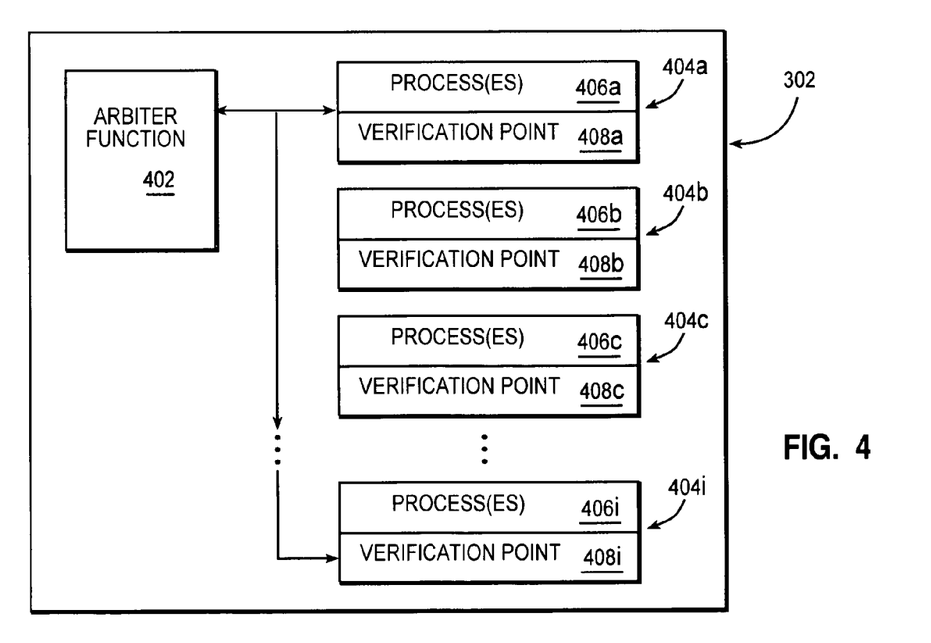
FIG. 4 illustrates in greater detail and in functional block form a portion of FIG. 3.

An exemplary test script 308, illustrated in logical organization in FIG. 4, illustrates the various components contained therein and the relationships therebetween. Generally, a test script 308 embodying aspects of the present invention will include an arbiter facility 402, and one or more testing portions 404 (several testing portions are illustrated—404*a*, 404*b*, 404*c*, . . . , 404*i*). During execution of a test script 308 one or more of the testing portions 404 may be executed. The result of an executed testing portion 404 is generated or output by one or more verification points included as part of the testing portion. The result from a testing portion 404 is then used by arbiter facility 402 to direct which further test portions 404 are executed and/or to generate the data which is output by test script 308.

A testing portion 404 includes one or more processes (e.g., instructions, steps, etc.) 406 and one or more verification points 408. A verification point 408 uses the results generated by the execution of process(es) 406 to generate data representative of the success or failure of testing portion 402. As described in related application CA9-2001-0092 entitled "TESTING MEASUREMENTS" and hereby incorporated herein by reference or, alternatively, attached hereto as Appendix A, data output by a verification point 408 and, consequently, testing portion 404 may output a binary or boolean value (e.g., TRUE/FALSE, 0/1, ON/OFF, etc.) or may output a non-boolean or non-binary value representative of, for example, the relative success of execution of processes 406.

Processes 406 (processes 406*a*-406*i* are illustrated) are the various steps or processes that are performed to test application 312. This may include, for example, transmitting data used as input to a user interface of application 312, issuing commands to application 312 and the like.

Each testing portion 404 (which may also be a test script with or without an arbiter facility 402) may or may not be executed as part of test script 308. Moreover, the order in which testing portions 404 are executed is not fixed like a conventional test script but may be dynamic based on the operation of arbiter facility 402. Whether a selected testing portion 404 is executed is also determined by the operation of arbiter facility 402.

Figure 5:
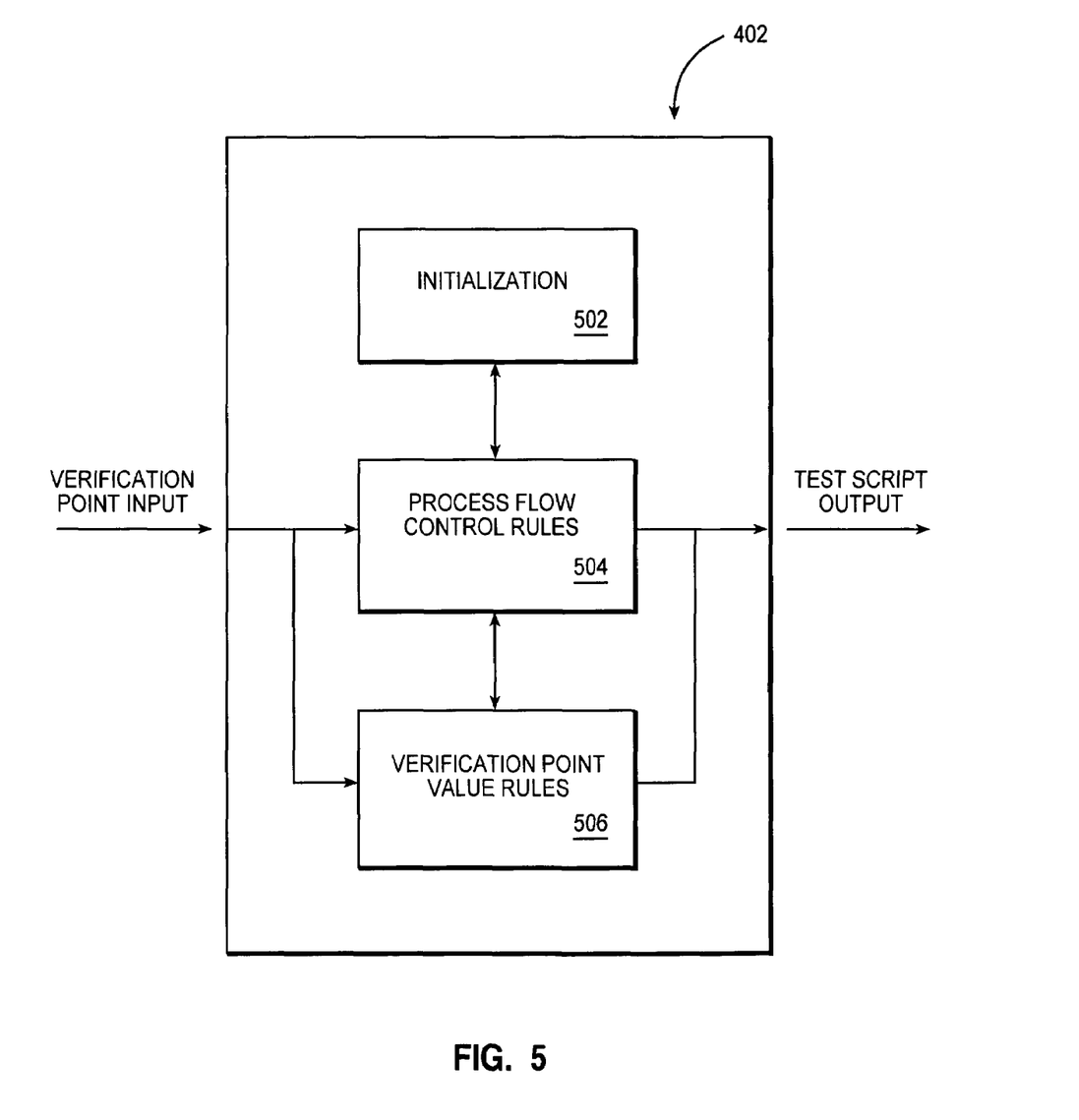
FIG. 5 illustrates in greater detail a portion, in functional block form; of FIG. 4.
Figure 6A:
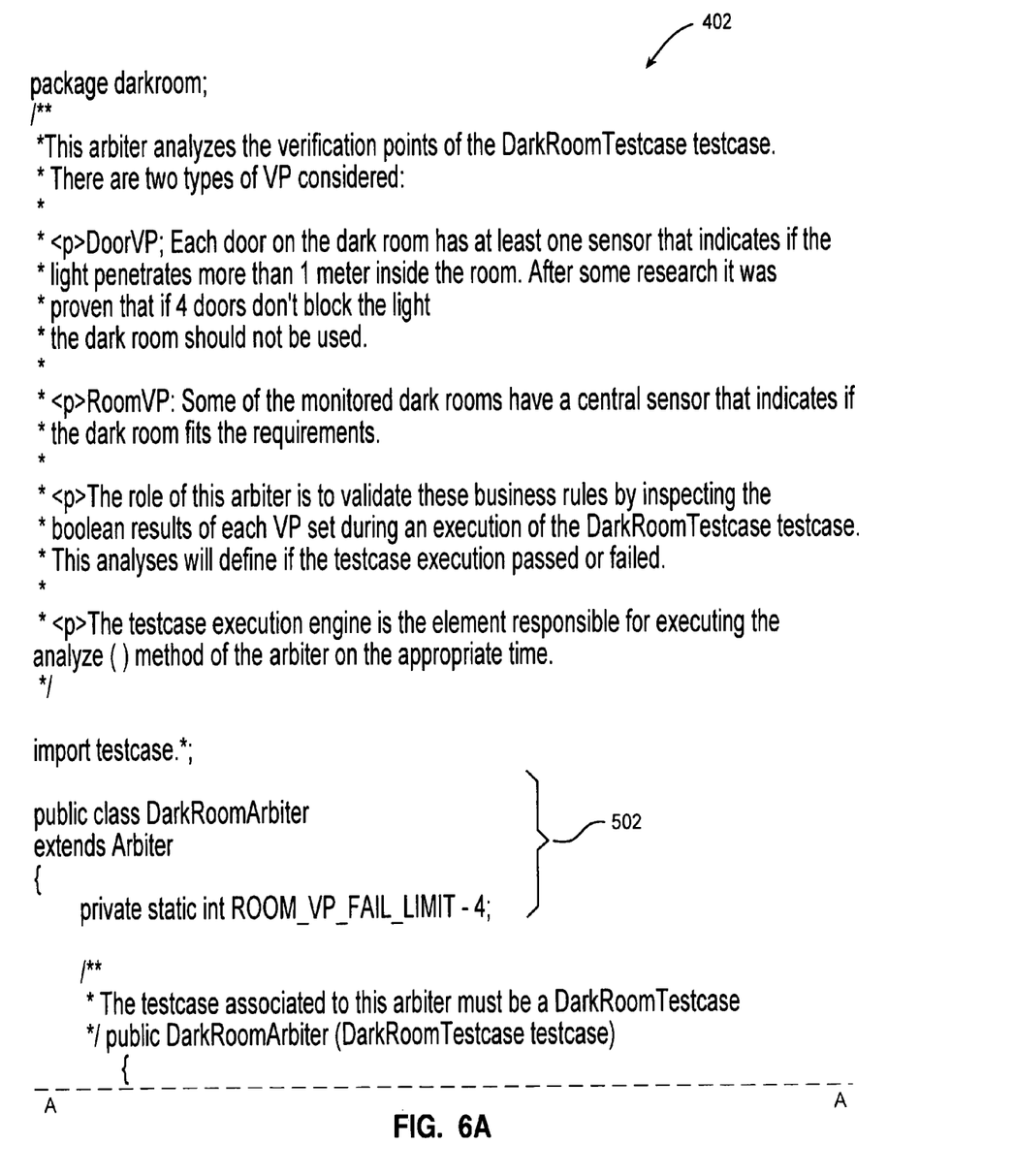
FIG. 6 is first exemplary source code embodying aspects of the portion of the invention illustrated in FIG. 5.
Figure 6B:
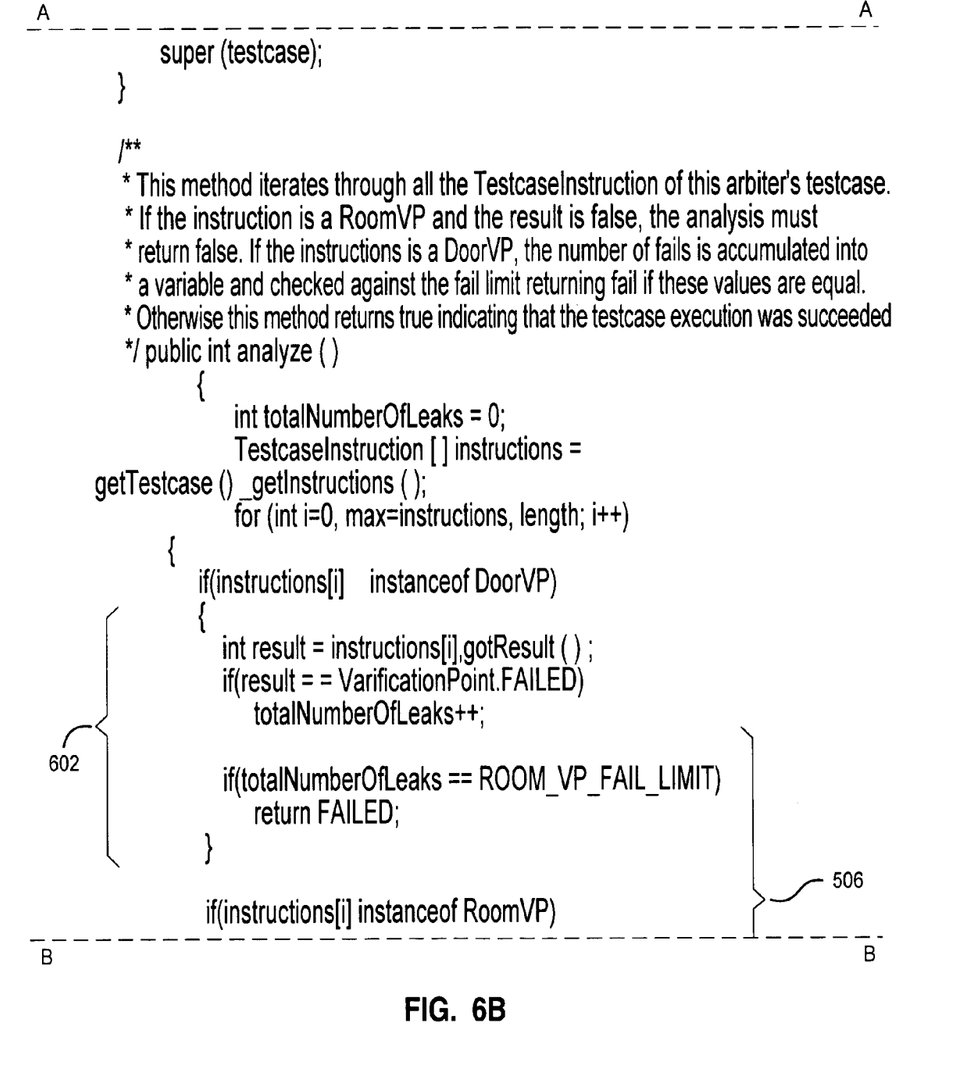
Figure 6C:
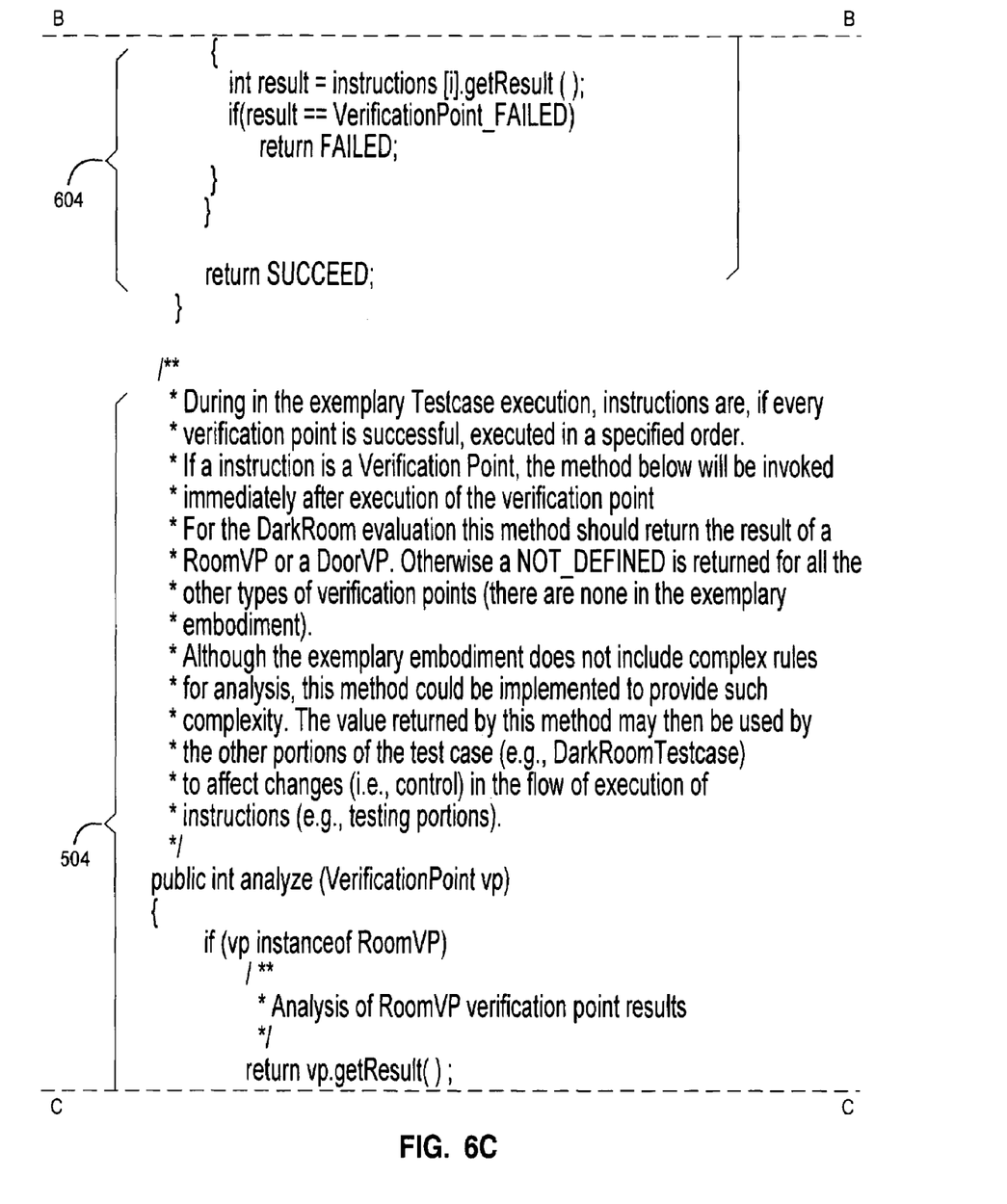
Figure 6D:
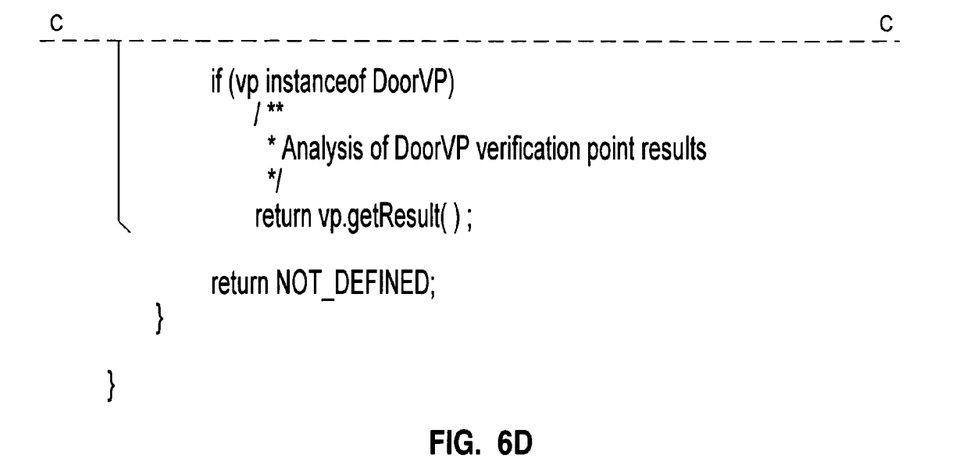
Figure 7A:
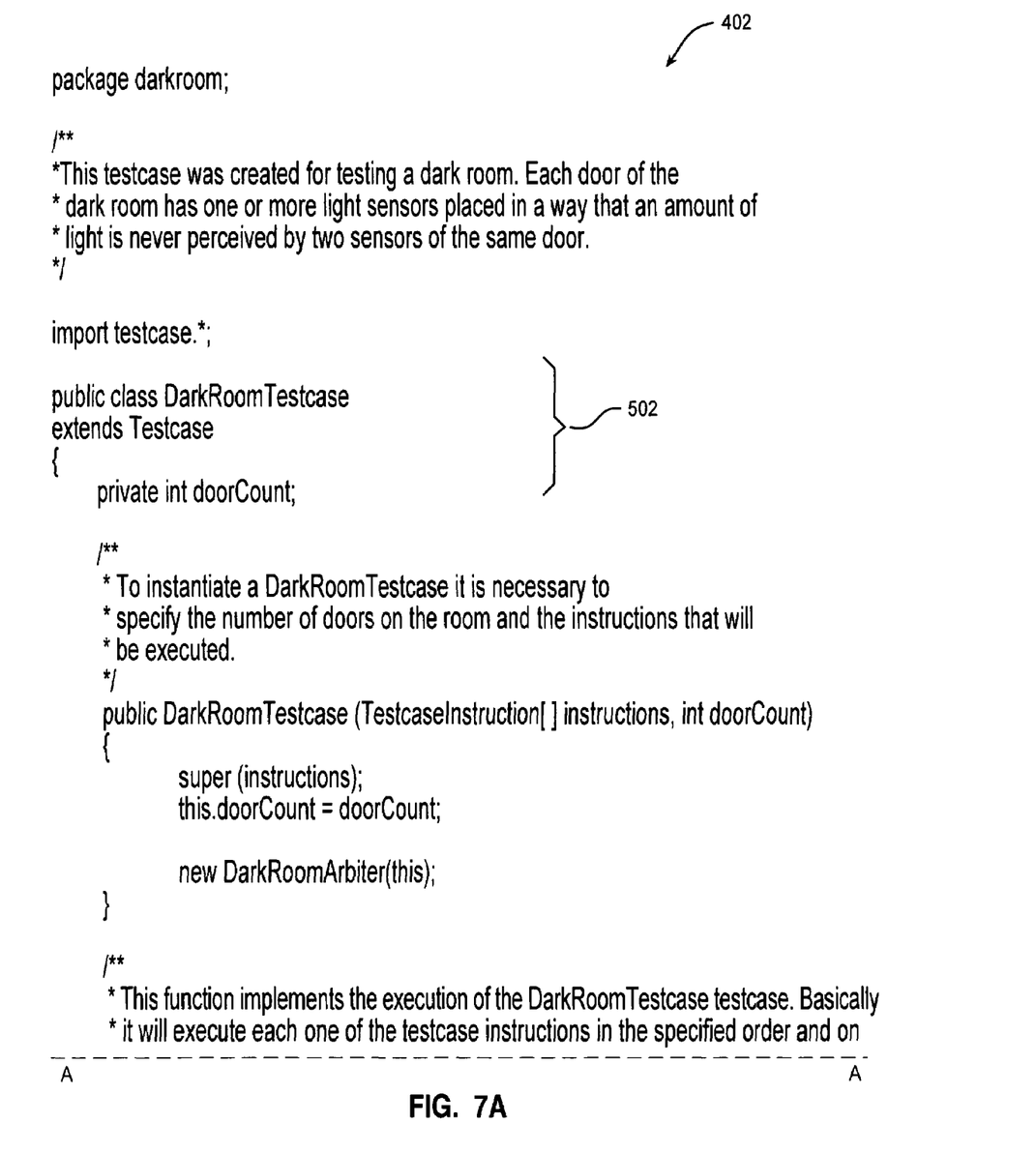
FIG. 7 is second exemplary source code embodying aspects of the portion of the invention illustrated in FIG. 5.
Figure 7B:
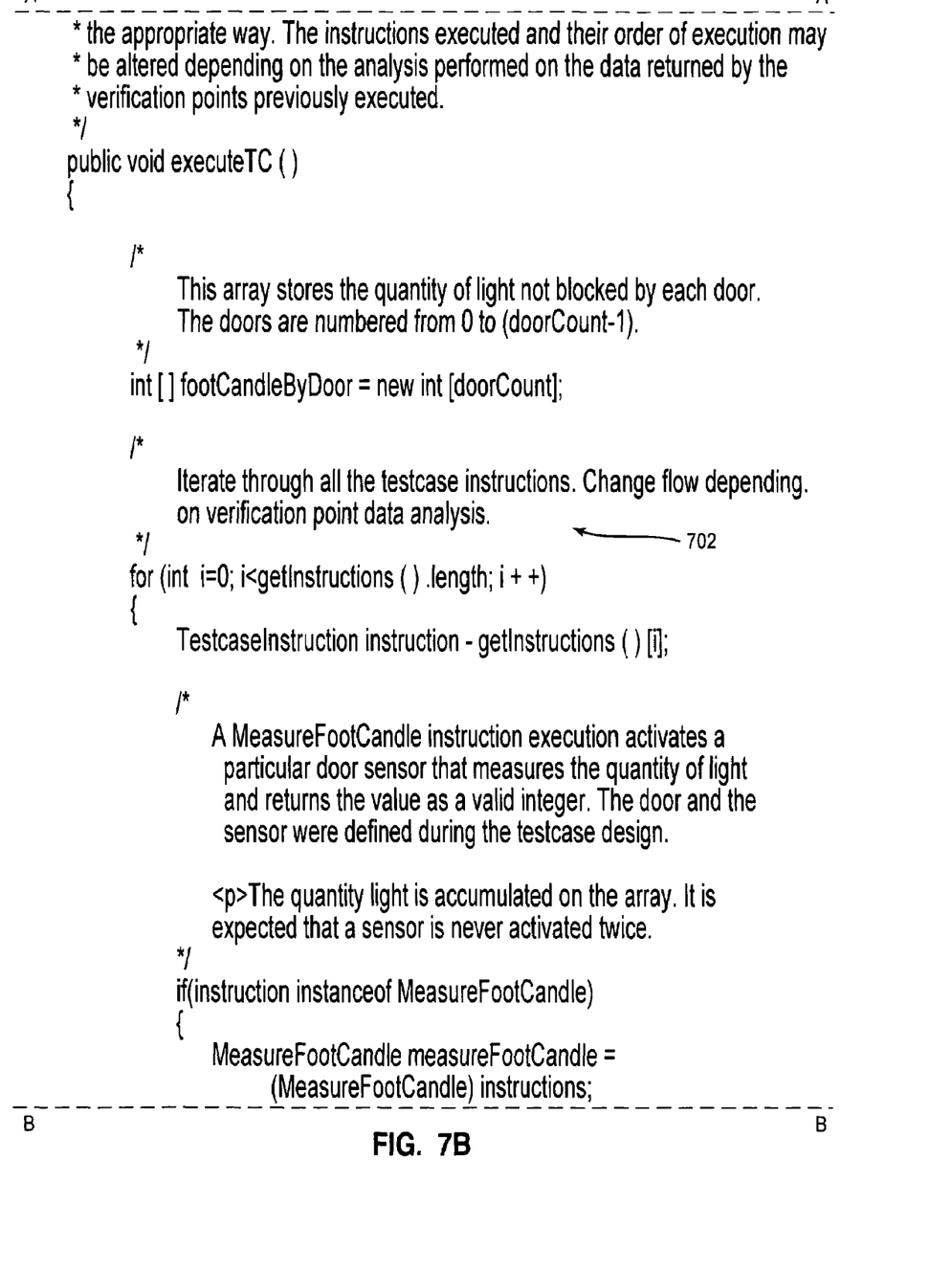
Figure 7C:
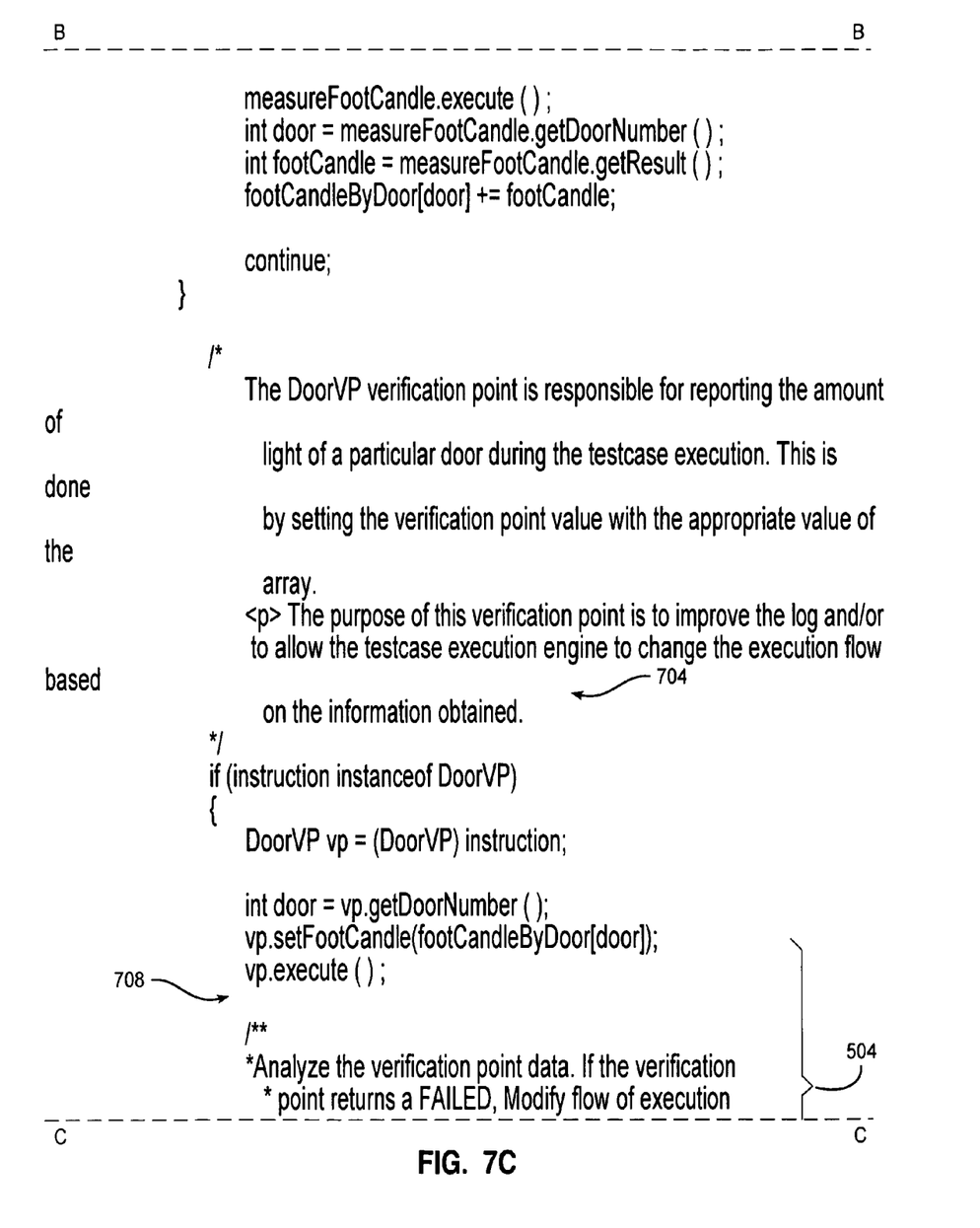
Figure 7D:
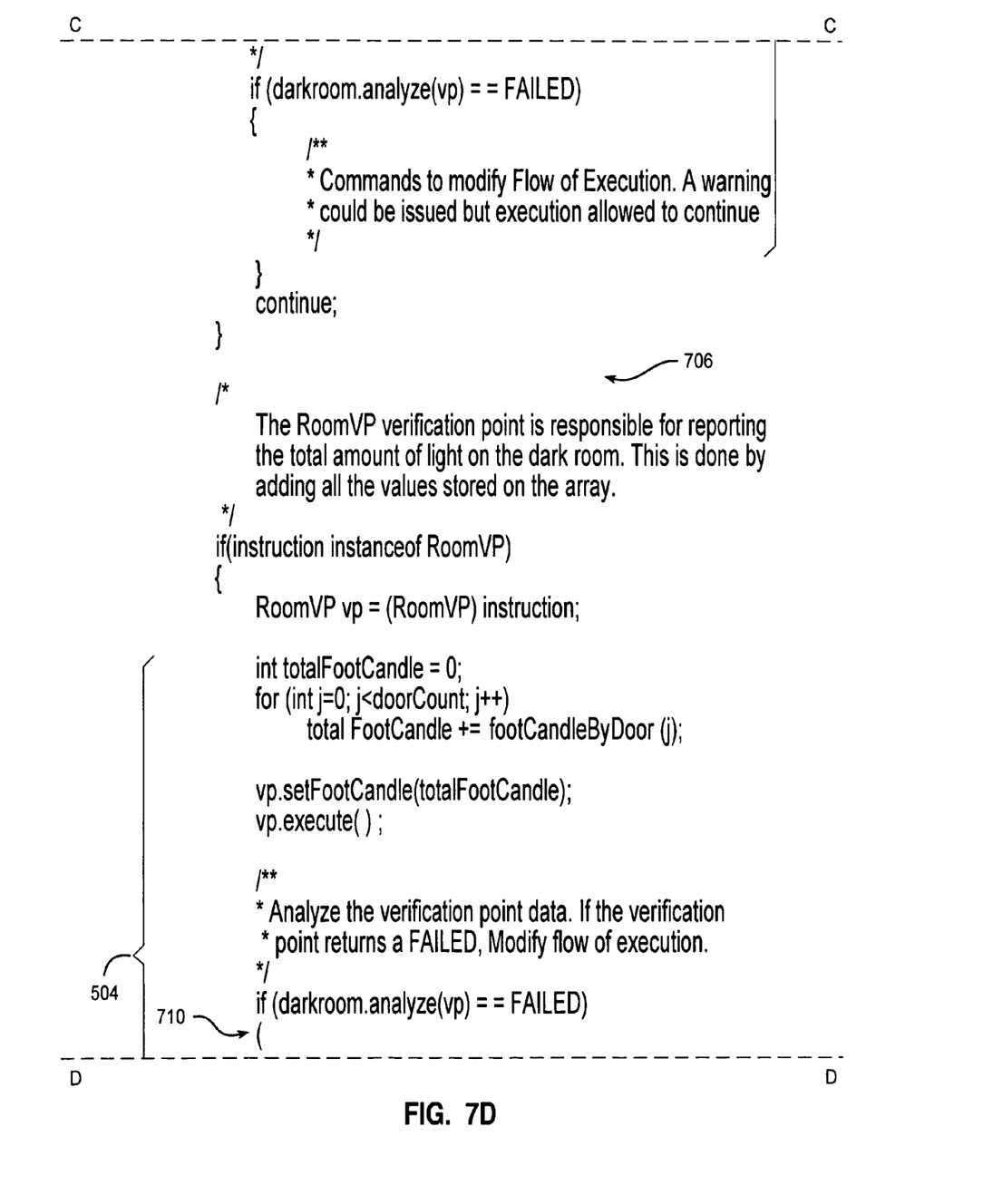
Figure 7E:
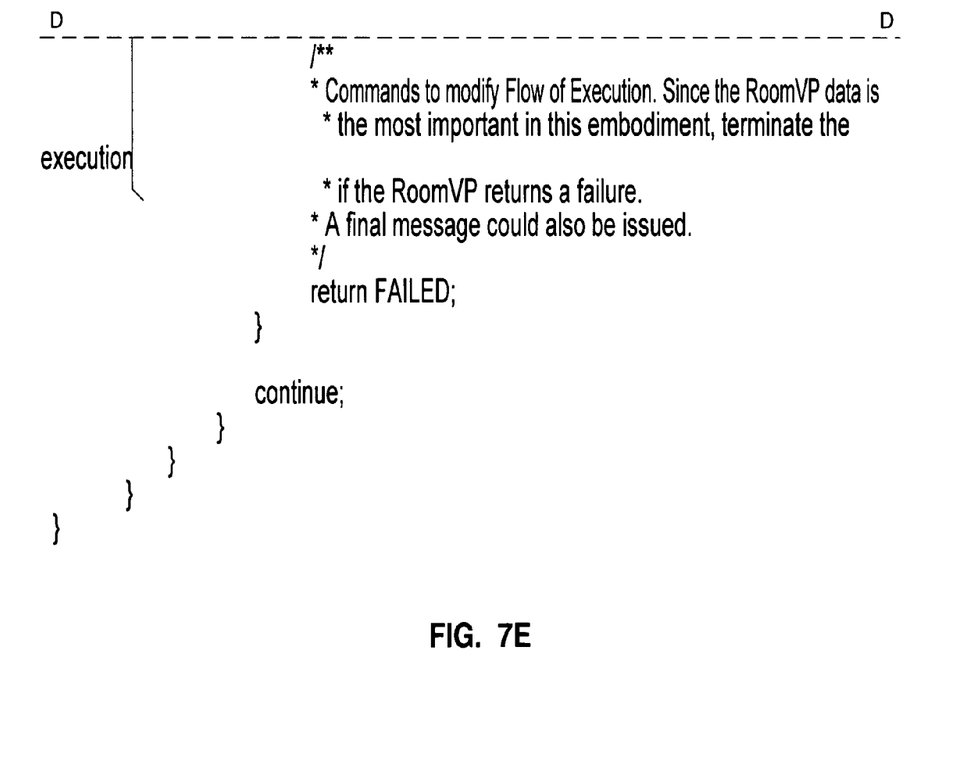

An exemplary arbiter facility 402 is illustrated in greater detail in functional block form in FIG. 5. Arbiter facility 402 includes three functional block: initialization 502; process flow control rules 504; and verification point value rules 506. As those of ordinary skill in the at will appreciate, the functional blocks of arbiter facility 402, which are described in greater detail below, may be rearranged, reordered or reorganized into a different number of functional blocks while performing the operations described herein. For example, in the exemplary embodiment shown as JAVA language source code in FIGS. 6 and 7, the process flow control rules 504 span both source code files.

Arbiter facility 402 receives input (i.e., data) or uses input from one or more testing portions 402 to generate test script output 310. Data received or used by arbiter facility 402 is used by both process flow control rules 504 and verification point value rules 506. It should be noted that not all data received by arbiter facility 402 will be used by either process flow control rules 504 or verification point value rules 506. Moreover, some data used by process flow control rules 504 may not be used by verification point value rules 506 and vice versa.

Initialization 502 initializes arbiter facility 402 for further operation. This initialization may include, for example, setting of variables, instantiating objects of various classes, allocating memory and the like.

Process flow control rules 504 allow arbiter facility 402 to dynamically order the execution of testing portions 404 and to dynamically determine which testing portions 404 are to be executed. This dynamic aspect of arbiter facility 402 uses data received from executed testing portions 404. That is, test script 308 through arbiter facility 402 and, more particularly, flow control rules 504, will operate differently (i.e., different order of execution of testing portions 404 and/or different testing portions 404 being executed) depending on the results received from one or more verification points 408 of one or more executed testing portions 404.

For example, a first testing portion 404 (testing portion 404a, for example) may be used to determine, at a high or gross level of detail, whether a certain function of subject under test 312 (FIG. 3) is operating as designed. A second testing portion 404 (testing portion 404b, for example) may be designed to test more detailed aspects of the function (i.e., at a low or fine level of detail) if the same function is operating as designed. Accordingly, through operation of process flow control rules 504, arbiter facility 402 may first execute the first testing portion to ascertain or determine, at a gross level of detail, whether the function operated as designed (e.g., SUCCESSFULLY). Once executed, arbiter facility 402 will receive data from verification point 408a indicating this state. If, the function performed successfully, arbiter facility 402, using the received data may then terminate the execution of test script 308 and output data indicate that the function performed successfully. However, in the instance where the subject under test has not performed satisfactorily, arbiter facility 402, through operation of process flow control rules 504 using input from verification point 408a, may then determine that additional data as to the unsatisfactory operation of the subject under test is required. Accordingly, in this instance arbiter facility 402 will then call (i.e., have executed) testing portion 402b. Testing portion 402b, through operation of verification point 408b, will provide arbiter facility 402 with additional data to analyze or process enabling a more detailed and useful test script output 310 to be generated.

As a consequence of the above example, persons of ordinary skill in the art will appreciate that the order of execution of testing portions 404 and whether a particular testing portion is executed in test script 308 is dynamically determined based on the data received by the arbiter facility from the execution of executed testing portions 404. This is in contrast to conventional test scripts where the order of execution is fixed at the time of creation of the test script and the testing portions executed are also fixed at the same time.

Verification point value rules 506 explicitly express the value to be attributed to the output of a verification point 408 of a testing portion 404. Unlike conventional test scripts where the report of a single failure from one verification point results in the output of FAILURE from the test script as a whole, the value of a test output received from a verification point can be weighted by an explicit expression within verification point value rules 506. Moreover, unlike conventional test scripts which implicitly define a rule which effectively 'AND's the boolean verification point results received, a more complex and considered assessment of the verification point results can be implemented in verification point value rules 506. This modification of the explicit valuation of a verification point is documented and, thus, available for review and consideration by other developers.

For example, returning to the database example described above in the background, verification point value rules 508 could be implemented to value as more important the transmitting of an update request and verification that the request was properly handled and value as comparatively less important processes or instructions of gaining access (e.g., logging on) to the database and logging off the database. This aspect of explicit weighting or valuing of individual verification points enables developers to consider the value of a verification point during the implementation of a test case rather than at the end of the development cycle.

Moreover, the valuation of one or more verification points can easily be adjusted and expressed by a developer through modification of verification value rules 506.

It is to be noted that not all data received by arbiter facility 402 need be used by verification point value rules 506 to generate test script execution output (stored in test output 310—FIG. 3). That is, some data received by arbiter facility 402 from verification points 408 may not be used during operation of verification point value rules 506. Similarly, not all data received by arbiter facility 402 need be used by process flow control rules 504 to dynamically determine which testing portions 404 to execute and the order thereof. Further, data from a single verification point 408 may be used by both process flow controls rules 504 and verification point value rules 506.

Figure 8:
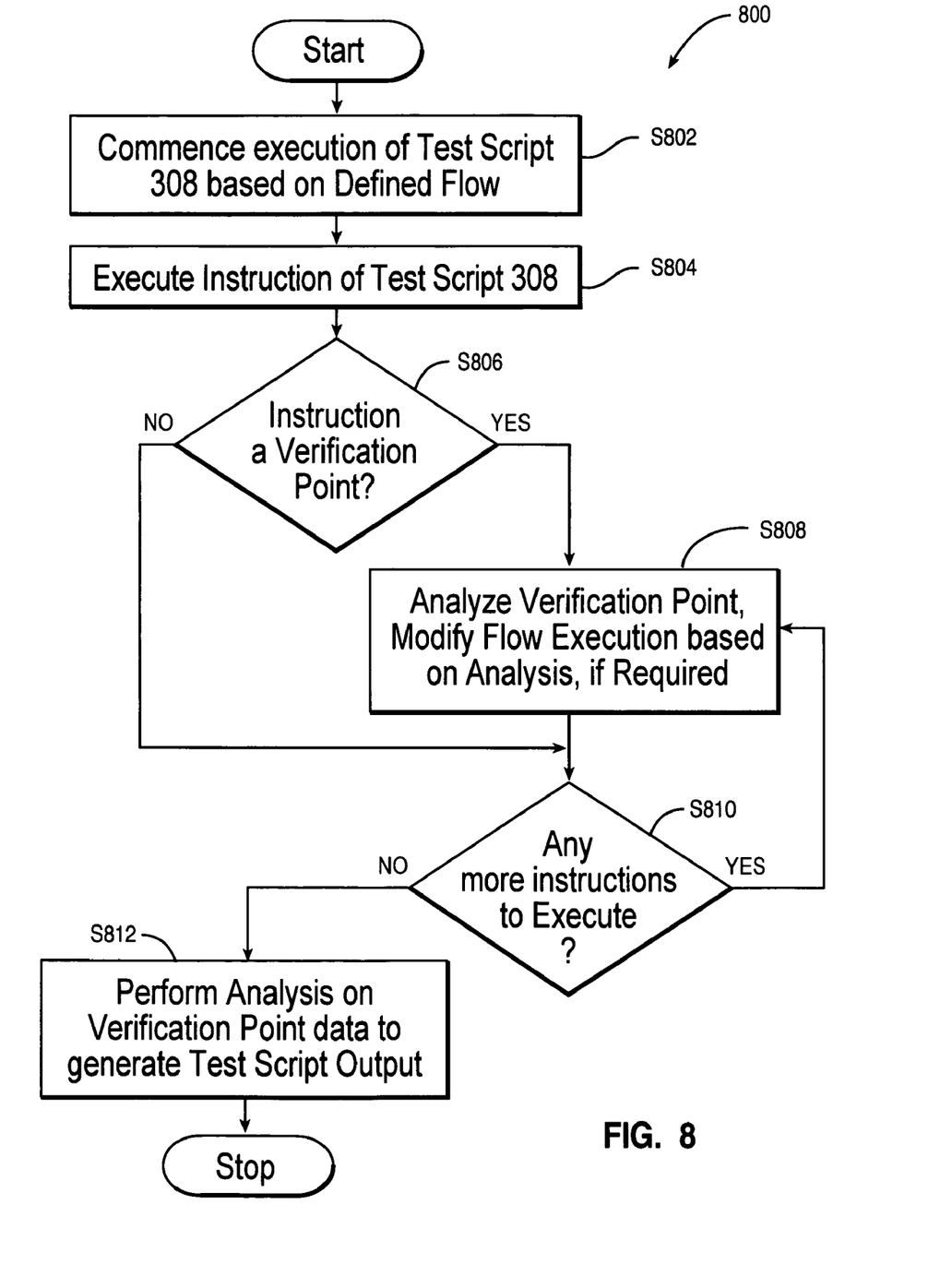
FIG. 8 is a flow chart illustrating the operations performed by first and second source code of FIGS. 5 and 6, respectively.

An exemplary portion of a test script 308 which includes an arbiter facility 402 and is embodied in a JAVA language object, is illustrated in FIGS. 6 and 7 (each of which, due to its length, is illustrated on two separate drawing sheets). That is, the arbiter facility 402 spans two separate source code files illustrated separately in FIGS. 6 and 7. The operations of the exemplary test script 308 and, more particularly, the operations of arbiter facility 402 are illustrated in FIG. 8 as operations 800.

The exemplary arbiter facility 402 is used as part of a test script 308 which implements a test case for a photographic dark room application 312. In the test case there are two testing portions 404 (which are not illustrated)—DoorVP and RoomVP. The test case implemented as the test script, which includes the exemplary arbiter facility 402 of FIG. 6 (hereinafter the "DarkRoomArbiter 402"), tests an application 312 which is to be used to certify whether a photographic darkroom is sufficiently dark to be usable as a darkroom. A darkroom may have several doors to provide access to the room and each door may enable a certain amount of light to leak into the room. The application under test includes several light sensors (one for each door) which send data representative the amount of light received by the sensor for a particular door. Additionally, a centrally mounted light sensor, which can receive light from any direction, sends data representative of the amount of light reaching a central position within the room.

DarkRoomArbiter 402 returns (i.e., generates or outputs) a single boolean value (FAILED or SUCCEED). However, other outputs (e.g., different output data types, non-boolean outputs, multiple outputs) could alternatively be employed.

The first testing portion 404—DoorVP—includes several processes 406 (referred to as "instructions" in the JAVA code) and a single verification point 408. The DoorVP verification point outputs an array containing boolean values (SUCCEED or FAILED) for each light sensor associated with a door. The processes within the DoorVP testing portion are designed to test whether data is being received by the application under test from each of the sensors.

The second testing portion 404—RoomVP—includes several processes 406 and a single verification point 408. The RoomVP testing portion is designed to test whether the application under test is receiving data from centrally positioned light sensor (the room light sensor) representative of the light collected. The verification point 408 associated with this testing portion returns a single boolean value (SUCCEED or FAILED) (in contrast to the DoorVP testing portion which returns an array of boolean values). A FAILED return value, indicates that data was not properly received by the application under test. A SUCCEED indicates the opposite.

Operations 800, illustrated as a flow chart in FIG. 8, are performed by test script 308. Referencing operations 800 of FIG. 8, the exemplary test script 308 commences execution and there exists a predefined flow of execution of testing portions 404 (S802). But, as is described below, this predefined flow of execution may be changed (i.e., altered or modified) based on analysis performed on the results generated by individual verification points (S808). For each instruction of a testing portion 404 which is executed (S804), a determination is made as to whether an instruction executed is a verification point 408 (S806). If it is determined that the executed instruction is not a verification point, execution of further instructions (if further instructions exist—S810) are executed (S804). However, if an executed instruction is determined to be a verification point (S806), analysis of the results generated by the verification point 408 are performed (S808). The results of the analysis of an individual verification are then used by arbiter function 402 (this portion forming part of FIG. 7) to alter the flow of execution of further instructions. Once all of the necessary instructions are executed (which, due to the analysis performed on one or more verification points—S808, and any resulting execution flow modification, may not be all of the instructions forming testing portions 404), a further analysis of all or some of the data generated by the verification points is performed (S812). Execution of the test script 308 is then completed. As will be appreciated by those of ordinary skill in the art, some reordering of the operations S802-S812 can be made in alternative embodiments of the present invention.

Referencing the source code forming part of FIGS. 6 and 7, over which arbiter facility 402 spans, FIG. 6 includes initialization 502 (FIGS. 5 and 6). Initialization 502 consists of setting a variable which indicates the maximum number of FAILs from the DoorVP testing portion. Initialization 502 also provides a check to ensure that DarkRoomArbiter 402 is communicated with the appropriate test case.

The process flow control rules 504 are, in the exemplary embodiment, executed once for each verification point 408 in the test script 308. Process flow control rules 504 are processed whenever a verification point has reported its results.

Process flow control rules includes aspects embodied and illustrated in FIGS. 6 and 7. Initially, a loop 702 predefines the flow of execution of the test script. Loop 702 attempts to iterate through each instruction of the testing portions 404 being executed (this corresponds to operation S802—FIG. 8). However, as indicated by source portions 704 and 706, for each instruction executed, a determination is made as to whether the instruction forms part of a RoomVP testing portion or a DoorVP testing portion (S806). The results generated by the verification point associated with the respective testing portions are then analyzed (source portions 708 and 710). The analysis of a verification point is performed by the process flow control rules 504 illustrated in FIG. 6. The results of an analysis is then used by the source code illustrated in FIG. 7 to modify the predefined execution flow originally defined by loop 702 (S808).

As will be appreciated, the determination of whether an instruction is a verification point (S806), the analysis of the verification point and any resulting modification of the predefined order and inclusion of instructions which are executed (S808) span the source code files illustrated in FIGS. 6 and 7.

As will be appreciated, the exemplary embodiment provides only simple process flow control rules 504. However, more complex rules could be equally be employed (e.g., combinations of one or more of: branching instructions; loops; linear execution; etc.).

By modification of the process flow control rules 504 very complex scenarios and operations can be implemented. Moreover, the dynamic nature of arbiter facility 402 as a result, in part, of the process flow control rules can provide developers with a sophisticated method for testing a subject under test.

In the DarkRoomArbiter 402 embodiment, the verification point values rules 506 consist of a loop which apply different processes depending on whether, in an iteration through the loop of the verification point values rules, the testing portion being analyzed is a DoorVP or a RoomVP. If the testing portion 404 is a DoorVP, rule 602 (DoorVP rule 602) is applied. If the testing portion 404 is a RoomVP, rule 604 (RoomVP rule 602) is applied. Other or additional rules could equally be applied.

DoorVP rule 602 explicitly expresses that the application under test should not FAIL unless more than a defined threshold of failures is reached. This threshold is defined by the variable set during initialization 502. In the exemplary embodiment, if there is a failure to receive data from more than four light sensors associated with the doors, then the application under test is to be considered to have failed the test case. The formula or explicitly expressed rule in the exemplary embodiment is an addition formula in contrast to the implicit ANDing formula in conventional test scripts. Other and different formulas could have been applied. For example, one light sensor associated with the main door to the darkroom could generate more valuable data then other doors leading to different portions of the darkroom. As such, data from this light sensor could be weighted by, for example, increasing the count of FAILEDs by a number larger than one or discounting FAILEDs received from the verification points associated with the other light sensors.

If it is determined, during an iteration of the loop of verification point value rules 506, that data is being received from the verification point of the RoomVP testing portion, then a different rule, RoomVP rule 604, is applied. RoomVP rule 604 results in the termination of execution of test script 308 and the output of a FAILED. The explicitness of RoomVP rule 604 expresses the relative weight of the results generated from a verification point associated with a RoomVP testing portion and the weight associated with results generated from a verification point associated with a DoorVP testing portion. That is, if data is not received from a single light sensor associated with a door, the test may still be considered a success. However, if data is not received from the single, centrally located room sensor, then the application is considered to have FAILED the test. Thus, the proper operation of the application to receive data from the centrally located room sensor is of much greater importance than the proper operation for receiving data from the other light sensors.

If, prior to data being received or analyzed from a verification point associated with the DoorVP testing portion, the threshold is reached, then execution of test script 308 is terminated and a FAILED is output by test script 308 (through operation of arbiter facility 402). As a consequence of this action, the analysis of the various verification point data received is also dynamically altered by arbiter facility 402. Other changes to the flow of the processing or analyzing of verification point data from testing portions 404 could have equally been employed. For example, arbiter 402 could analyze the data received from RoomVP testing portion 404 first. If data was not received from the light sensor being testing, then the execution of test script 308 could be terminated as this is the most important sensor being used. This feature may shorten the execution time of test scripts providing results more quickly to developers and more relevant or important data more quickly.

The explicit nature of the verification point value rules provide significant benefits to the developer. Moreover, because relative weights can be applied to the results received from various verification points, the relative importance of a verification point can be reflected in the output from test script 308 and be used to dynamically affect further processing of test script 308. Moreover, the rationale for valuing certain data generated by a selected verification point to a greater or lesser degree than data generated by another verification point will be expressed explicitly by the verification point value rules.

As will be appreciated by those of ordinary skill in the art, embodiments of the invention may be preferably embodied in computer software. However, alternative embodiments may be embodied in a combination of hardware and software or in hardware alone.

While the arbiter facility described herein outputs a single boolean value, alternative embodiments could equally output: a single non-boolean value; a plurality of values (boolean or otherwise); or a combination of boolean and non-boolean values.

As will be appreciated by those skilled in the art, modifications to the above-described embodiment can be made without departing from the essence of the invention.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method for testing a portion of a computer application using a test script, the method comprising:
   responsive to data generated by a verification point, analyzing the data; and
   responsive to analyzing the data, modifying a predefined execution flow of the test script, wherein analyzing the data determines a value in the data that is representative of the importance of the verification point.

2. The method of claim 1 wherein said test script comprises a plurality of instructions and wherein said modifying comprises at least one of:
   executing only selected subset of said plurality of instructions; and
   rearranging the order of execution of at least a portion of said plurality of instructions.

3. The method of claim 1 wherein said modifying comprises employing flow control execution rules to modify said predefined execution flow.

4. A method for testing a portion of a computer application using a test script, the method comprising:
   responsive to data generated by each of a plurality of verification points, employing expressed verification point valuation rules to value each of the plurality of verification points; and
   generating a test script output responsive to the value of each of the verification points, wherein the value of each of the verification points is representative of the importance of each verification point.

5. The method of claim 4 wherein the employing expressed verification point valuation rules comprises employing a formula for assigning a weighted value to each result generated by the plurality of verification points, wherein the weighted value indicates the importance of each result.

6. The method of claim 4 wherein a result of a verification point comprises one or more of: a boolean value and a non-boolean value.

7. The method of claim 4 wherein said generating a test script output comprises generating one or more values, said one or more values comprising one or more of: boolean values; and one or more non-boolean values.

* * * * *